(12) United States Patent
Tu et al.

(10) Patent No.: US 12,337,806 B2
(45) Date of Patent: Jun. 24, 2025

(54) CONTROL METHOD FOR HYDRAULIC RETARDER, AND CONTROL SYSTEM

(71) Applicant: Xiamen Yaxon Zhilian Technology Co., Ltd., Fujian (CN)

(72) Inventors: Yankai Tu, Fujian (CN); Yuan Chen, Fujian (CN)

(73) Assignee: Xiamen Yaxon Zhillian Technology Co., Ltd., Fujian (CN)

( * ) Notice: Subject to any disclaimer, the term of this patent is extended or adjusted under 35 U.S.C. 154(b) by 66 days.

(21) Appl. No.: 18/006,419

(22) PCT Filed: Dec. 28, 2020

(86) PCT No.: PCT/CN2020/139955
§ 371 (c)(1),
(2) Date: Jan. 23, 2023

(87) PCT Pub. No.: WO2022/016807
PCT Pub. Date: Jan. 27, 2022

(65) Prior Publication Data
US 2023/0347856 A1 Nov. 2, 2023

(30) Foreign Application Priority Data

Jul. 21, 2020 (CN) .......................... 202010705074.0

(51) Int. Cl.
*B60T 10/00* (2006.01)
*B60K 31/06* (2006.01)
*B60W 10/196* (2012.01)

(52) U.S. Cl.
CPC .............. *B60T 10/00* (2013.01); *B60K 31/06* (2013.01); *B60T 2201/04* (2013.01);
(Continued)

(58) Field of Classification Search
CPC .. B60T 10/00; B60T 2201/04; B60T 2210/20; B60K 31/06; B60W 2552/15;
(Continued)

(56) References Cited

U.S. PATENT DOCUMENTS 6,299,263 B1 * 10/2001 Uematsu ................ B60K 31/00
303/123
2014/0257656 A1 * 9/2014 Schwartz .................. B60T 7/12
701/61
(Continued)

FOREIGN PATENT DOCUMENTS

CN 102666233 A 9/2012
CN 104773151 A 7/2015
(Continued)

OTHER PUBLICATIONS

International Search Report cited in PCT/CN2020/139955 mailed Apr. 20, 2021, 6 pages.
(Continued)

*Primary Examiner* — Truc M Do
(74) *Attorney, Agent, or Firm* — Cooper Legal Group, LLC

(57) ABSTRACT

Disclosed are a control method for a hydraulic retarder, and a control system. The method includes: acquiring a slope of a downhill road segment ahead of a vehicle; determining whether an absolute value of the slope is greater than an absolute value of a slope for which a braking force is not required; if so, predicting a required braking force and oil amount for the vehicle at a steady speed; predicting, according to the oil amount, oil filling time and a distance between the vehicle and an origin of the above road segment at the start time of oil filling of the hydraulic retarder; in the case that the actual distance of the vehicle is equal to a predicted distance, starting oil filling; and upon the vehicle reaching the origin of the road segment, starting braking. The present (Continued)

disclosure can lower wear of brake pads and reduce vehicle running costs.

14 Claims, 2 Drawing Sheets

(52) U.S. Cl.
 CPC ........ *B60T 2210/20* (2013.01); *B60W 10/196* (2013.01); *B60W 2552/15* (2020.02); *B60W 2710/18* (2013.01); *B60Y 2300/181* (2013.01); *B60Y 2300/18108* (2013.01); *B60Y 2400/81* (2013.01)

(58) Field of Classification Search
 CPC ............ B60W 10/196; B60W 2710/18; B60Y 2300/181; B60Y 2300/18108; B60Y 2400/81
 See application file for complete search history.

(56) References Cited

U.S. PATENT DOCUMENTS

| | | | |
|---|---|---|---|
| 2017/0110021 A1* | 4/2017 | Skagius | B60K 35/22 |
| 2019/0072008 A1* | 3/2019 | Bang | F01L 1/344 |
| 2020/0055492 A1* | 2/2020 | Van Dingenen | F01P 3/20 |
| 2021/0213917 A1* | 7/2021 | Johnson | B60T 15/028 |

FOREIGN PATENT DOCUMENTS

| | | |
|---|---|---|
| CN | 104908728 A | 9/2015 |
| CN | 105008187 A | 10/2015 |
| CN | 105752062 A | 7/2016 |
| CN | 106994966 A | 8/2017 |
| WO | 2019209158 A1 | 10/2019 |

* cited by examiner

CONTROL METHOD FOR HYDRAULIC RETARDER, AND CONTROL SYSTEM

TECHNICAL FIELD

The present disclosure relates to the field of vehicle control, in particular to a control method for a hydraulic retarder, and a control system.

BACKGROUND

The wear on brake pads of heavy trucks during braking is very serious, and physical friction braking may have the problem of thermal failure. Retarders are another type of braking system on heavy trucks, especially hydraulic retarders, which have the advantage of conducting braking heat in time and are simple in structure, safe and convenient. However, the hydraulic retarders, which require the process of filling the retarders with braking fluid to produce a braking force, have a lag effect in response time, and are therefore not suitable for real-time or emergency braking.

At present, a hydraulic retarder is generally started manually by a driver, and is used mostly for long downhill segments, in order to reduce the wear on a friction braking system. But most drivers are still accustomed to only applying brakes, and it is difficult to ensure that the hydraulic retarder may be started correctly only by relying on subjective operations of persons. In order to achieve automatic control over the hydraulic retarder, in the Chinese Patent No. CN201510321728, with the title of "CONTROL SYSTEM AND CONTROL METHOD FOR HYDRAULIC RETARDER", opening and closing of the hydraulic retarder are combined with the depth of a brake pedal. However, this simple combined control method is prone to false triggering, affecting the economic efficiency and maneuverability.

SUMMARY

The main objective of the present disclosure is to provide a control method for a hydraulic retarder, and a control system, which perform prediction and advanced control based on road ahead road ahead information to start the hydraulic retarder at a proper time, thereby lowering the wear of brake pads, and reducing the waste of vehicle running costs.

The present disclosure adopts the following technical solution:

The present disclosure provides a control method for a hydraulic retarder. The method includes:

1.1 acquiring a slope of a downhill road segment ahead of a vehicle;

1.2 determining whether an absolute value of the slope of the downhill road segment ahead of the vehicle is greater than an absolute value of a slope for which a braking force is not required;

1.3 if the absolute value of the slope of the downhill road segment ahead of the vehicle is greater than the absolute value of the slope for which the braking force is not required, predicting a required braking force for the vehicle to travel, at a steady speed, on the downhill road segment ahead, and an oil amount required for the braking force;

1.4 predicting corresponding oil filling time according to the required oil amount;

1.5 predicting, according to the oil filling time, a distance between the vehicle and an origin of the downhill road segment ahead at the start time of oil filling of the hydraulic retarder, 1.6 in the case that the actual distance between the vehicle and the origin of the downhill road segment ahead is equal to a predicted distance, controlling the hydraulic retarder to start oil filling; and 1.7 upon the vehicle reaching the origin of the downhill road segment ahead, controlling the hydraulic retarder to start braking.

Preferably, step 1.7 further includes:

when the vehicle ends traveling on the downhill road segment ahead, ending braking by the hydraulic retarder.

Preferably, a calculation formula of the slope for which the braking force is not required is as follows:

$$\theta_{min} = -\mu - \frac{C_d H V_a^2}{21.15 \ mg}$$

where $\theta_{min}$ denotes the slope for which the braking force is not required, $\mu$ denotes a road friction coefficient, $C_d$ denotes an air density, $H$ denotes a windward area of the vehicle, $V_a$ denotes a windward speed of the vehicle, m denotes the mass of the vehicle and a load carried, and g denotes an acceleration of gravity.

Preferably, step 1.3 specifically includes:

predicting the required braking force $T_r$ for the vehicle to travel, at the steady speed, on the slope of the downhill road segment ahead according to the following calculation formula:

$$T_r = mg(\theta - \theta_{min})$$

where m denotes the mass of the vehicle and the load carried, g denotes the acceleration of gravity, $\theta$ denotes the slope of the downhill road segment ahead of the vehicle, and $\theta_{min}$ denotes the slope for which the braking force is not required; and calculating the oil amount Q required for the braking force based on the required braking force according to the following calculation formula:

$$Q = \frac{T_r}{\rho(v_3 R_3 - v_1 R_1)}$$

where $v_1$ denotes a flow velocity of oil at an inlet of a rotor impeller of the hydraulic retarder; $v_3$ denotes a flow velocity of the oil at the inlet of the rotor impeller, $R_1$ denotes a radius of the oil inlet of the rotor impeller, $R_3$ denotes a radius of an oil outlet of the rotor impeller; and $\rho$ denotes an oil density.

Preferably, step 1.3 specifically includes:

calibrating required braking forces for the vehicle to travel, at different speeds, on the downhill road segment ahead, and corresponding oil amounts; and acquiring a current traveling speed of the vehicle, and acquiring, based on the calibrated data, the required braking force $T_r$ for the vehicle to travel on the downhill road segment ahead, and the oil amount Q required for the braking force, the calibrated data including the calibrated speeds, required braking forces and corresponding oil amounts.

Preferably, the calibrated speeds, required braking forces and corresponding oil amounts are stored in the form of a data table, a graph, or a curve.

Preferably, a calculation formula for predicting the oil filling time in step 1.4 is as follows:

$$t = \frac{Q}{CA_1V_1}$$

where t denotes the oil filling time; Q denotes the oil amount; C denotes a flow coefficient; $A_1$ denotes a flow cross-sectional area of an oil filling line; and $V_1$ denotes an average velocity of oil filling.

Preferably, a calculation formula for predicting the distance in step 1.5 is as follows:

$$\text{Offset} = V_t$$

where Offset denotes the predicted distance, t denotes the oil filling time; and V denotes the steady traveling speed of the vehicle.

The present disclosure provides a control system, including a road ahead information acquisition module, a braking controller, and a hydraulic retarder;

the road ahead information acquisition module is configured to acquire information of a road ahead of a vehicle and send the information of the road ahead to the braking controller, the information of the road ahead including a slope of a downhill road segment ahead of the vehicle and a distance between the vehicle and an origin of the downhill road segment ahead;

the braking controller receives the information from the road ahead information acquisition module for implementing the control method for the hydraulic retarder according to any one of the above; and the hydraulic retarder is controlled by the braking controller to perform corresponding actions, the actions including starting oil filling, ending oil filling, starting braking or ending braking.

Preferably, the road ahead information acquisition module is implemented through an electronic horizon.

Compared with the prior art, the present disclosure has the following beneficial effects:

The control method for the hydraulic retarder and the control system according to the present disclosure are suitable for a cruising state with a steady vehicle speed, perform prediction and advanced control based on the information of the road ahead, and start the hydraulic retarder at the proper time, thus avoiding false triggering of an existing control method and alleviating the response lag of the hydraulic retarder. At the same time, by starting the hydraulic retarder for braking, the time for applying a brake for braking when the terrain changes may be shortened, thus lowering the wear of brake pads, reducing the waste of vehicle running costs, and having good economic efficiency.

DESCRIPTION OF EMBODIMENTS

For clearer descriptions of the objectives, technical solutions, and advantages of the present disclosure, implementations of the present disclosure will be described hereinafter in detail with reference to the accompanying drawings.

The execution subject of a method according to this embodiment is a braking controller of a vehicle, and an execution program and/or a database program of the method according to this embodiment may be installed to the braking controller of the vehicle, which is not specifically limited by the present disclosure.

It is to be noted that step identifiers involved in the claims and description of the present application are merely to make the document clearer, and during specific implementations, the order of the steps may be adjusted accordingly according to requirements.

Figure 1:
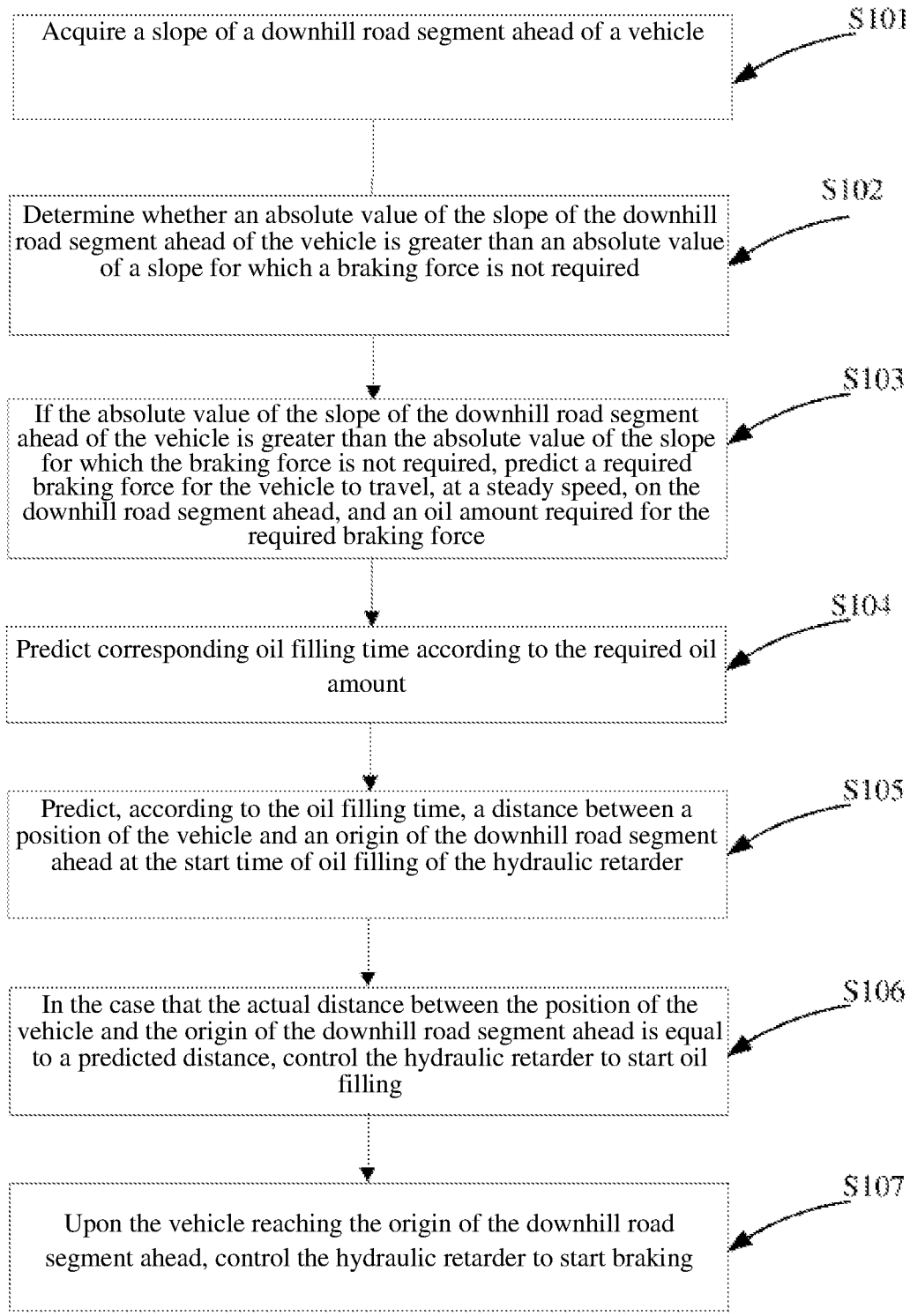
FIG. 1 is a schematic flow diagram of a method according to the present disclosure.

Embodiment 1: As shown in FIG. 1, a control method for a hydraulic retarder includes:

S101: Acquire a slope of a downhill road segment ahead of a vehicle.

S102: Determine whether an absolute value of the slope of the downhill road segment ahead of the vehicle is greater than an absolute value of a slope for which a braking force is not required.

S103: If the absolute value of the slope of the downhill road segment ahead of the vehicle is greater than the absolute value of the slope for which the braking force is not required, predict a required braking force for the vehicle to travel, at a steady speed, on the downhill road segment ahead, and an oil amount required for the required braking force.

S104: Predict corresponding oil filling time according to the required oil amount.

S105: Predict, according to the oil filling time, a distance between a position of the vehicle and an origin of the downhill road segment ahead at the start time of oil filling of the hydraulic retarder.

S106: In the case that the actual distance between the position of the vehicle and the origin of the downhill road segment ahead is equal to a predicted distance, control the hydraulic retarder to start oil filling.

S107: Upon the vehicle reaching the origin of the downhill road segment ahead, control the hydraulic retarder to start braking.

After step S107, the method further includes: when the vehicle ends traveling on the downhill road segment, end braking by the hydraulic retarder. Alternatively, after step S107, the method further includes: while the vehicle travels downhill, if it is detected that the slope of the downhill road segment changes and the absolute value of the slope of the downhill road segment is smaller than the absolute value of the slope for which the braking force is not required, end braking by the hydraulic retarder.

In this embodiment, in calculation of the slope in step S102, a calculation formula of the slope for which the braking force is not required is as follows:

$$\theta_{min} = -\mu - \frac{C_d H V_a^2}{21.15 \text{ mg}}$$

where $\theta_{min}$ denotes the slope for which the braking force is not required; $\mu$ denotes a road friction coefficient; $C_d$ denotes an air density; H denotes a windward area of the vehicle; $V_a$ denotes a windward speed of the vehicle, which is ideally approximately equal to a current traveling speed V of the vehicle; m denotes the mass of the vehicle and a load carried; and g denotes an acceleration of gravity.

Specifically, according to the force stationary equation of vehicle dynamics, a current resultant force applied to the vehicle is equal to the difference between a forward force provided by an engine and the external resistance to the vehicle. A calculation formula of the current resultant force applied to the vehicle is as follows:

$$F_a = F - F_{rot} - F_{slope} - F_{acc} - F_{win}$$

where $F_a$ denotes the current resultant force applied to the vehicle, $F_{rot}$ denotes the frictional resistance between tires of the vehicle and the ground, $F_{slope}$ denotes the gravitational resistance of the slope, $F_{acc}$ denotes the resistance to overcome the rotational inertia caused by the vehicle acceleration, and $F_{win}$ denotes the wind resistance to the vehicle.

Further, the external resistance to the vehicle may be obtained respectively by the following calculation formulas:

$$F_{rot} = mg\mu$$

$$F_{slope} = mg\theta$$

$$F_{acc} = m\delta a$$

$$F_{min} = \frac{C_d H V_a^2}{21.15}$$

where $\theta$ denotes the slope of the downhill road segment ahead of the vehicle, a denotes the acceleration of the vehicle, and $\delta$ denotes the rotational inertia.

Since the vehicle is in the cruising state, the acceleration $\alpha$ of the vehicle is 0, and $F_\alpha$ and $F_{acc}$ are equal to 0.

When $\theta = \theta_{min}$, the braking force is not required, in this case, the engine output is 0, which may just maintain a current cruising speed, such that F is also equal to 0.

Thus, the above formula $F_a = F - F_{rot} - F_{slope} - F_{acc} - F_{win}$ may be converted to:

$$F_{slope} = -F_{rot} - F_{win}$$

namely, $$mg\theta_{min} = -mg\mu - \frac{C_d H V^2}{21.15}$$

so $$\theta_{min} = -\mu - \frac{C_d H V^2}{21.15 \, mg}.$$

In one embodiment, in prediction of the braking force and the oil amount in step S103 (a monitoring method), predicting the required braking force for the vehicle to travel, at the steady speed, on the slope of the downhill road segment ahead, and the oil amount required for the braking force specifically includes:

Predict the required braking force $T_r$ for the vehicle to travel, at the steady speed, on the slope of the downhill road segment ahead as follows:

$$T_r = mg(\theta - \theta_{min})$$

Acquire the oil amount Q required for the braking force as follows:

$$Q = \frac{T_r}{\rho(v_3 R_3 - v_1 R_1)}$$

where $v_1$ denotes a flow velocity of oil at an inlet of a rotor impeller of the hydraulic retarder, $v_3$ denotes a flow velocity of the oil at the inlet of the rotor impeller, and as a rotor of the hydraulic retarder is fixed to a drive shaft of the vehicle and rotates with the drive shaft, the flow velocity of the oil may be approximately equal to a rotational speed of the drive shaft of the vehicle; $R_1$ denotes a radius of the oil inlet of the rotor impeller, $R_3$ denotes a radius of an oil outlet of the rotor impeller, and $R_r$ and $R_3$ are constants; and $\rho$ denotes an oil density, and $\rho$ is a constant.

In another embodiment, in prediction of the braking force and the oil amount in step S103 (a calibration method), predicting the required braking force for the vehicle to travel, at the steady speed, on the slope of the downhill road segment ahead, and the oil amount required for the braking force may further include:

Calibrate required braking forces for the vehicle to travel, at different speeds, on the slope of the downhill road segment ahead, and corresponding oil amounts.

Acquire a current traveling speed of the vehicle, and acquire, based on the calibrated data, the required braking force $T_r$ for the vehicle to travel on the slope of the downhill road section ahead, and the oil amount Q required for the braking force. The calibrated data include the calibrated speeds, required braking forces and corresponding oil amounts.

The calibrated speeds, required braking forces and corresponding oil amounts are stored in the form of a data table, a MAP graph, or a curve.

Specifically, a series of different braking torques $T_r$ to be achieved at different speeds V, and required oil amounts Q respectively may be pre-calibrated through the calibration method. Then, in this step, the required oil amount Q may be queried from the calibrated data based on Tr and the speeds V.

For example, when V=50 km/h, the corresponding relationship between the braking force $T_r$ and the oil amount Q is shown in Table 1 below ($N_{max}$ denotes the maximum braking force at the speed, and $Q_{max}$ denotes the maximum oil filling amount at the speed).

TABLE 1

| $T_r$ (N) | Q(L) |
|---|---|
| 1 | 0.7 |
| 1.5 | 1.3 |
| 2 | 2.2 |
| ... | ... |
| $N_{max}$ | $Q_{max}$ |

In addition, calibration tables for a plurality of speeds may be integrated to generate a three-dimensional calibration MAP with three axes: $T_r$, V and Q. In the three-dimensional calibration MAP, a value Q is found from values of the V and $T_r$ axes.

For prediction of the oil filling time in step S104, predicting the corresponding oil filling time according to the required oil amount is as follows:

$$t = \frac{Q}{CA_1 V_1}$$

where t denotes the oil filling time; Q denotes the oil amount; C denotes a flow coefficient; $A_1$ denotes a flow cross-sectional area of an oil filling line; and $V_1$ denotes an average velocity of oil filling.

For prediction of the distance in step S105, predicting, according to the oil filling time, the distance between the position of the vehicle and the origin of the downhill road segment ahead at the start time of oil filling of the hydraulic retarder is as follows:

$$\text{Offset} = V_t$$

where Offset denotes the predicted distance, t denotes the oil filling time; and V denotes the steady traveling speed of the vehicle.

In this embodiment, when the braking controller determines that the vehicle reaches a position Offset away from the downhill position, cruising at a steady speed is kept, and the hydraulic retarder starts oil filling. In this way, when the vehicle reaches the downhill position, the engine may not output torque, the hydraulic retarder plays the braking role, and the vehicle may keep the original cruising speed to travel at a constant speed on the condition that the engine does not output force. Thus, oil consumption is reduced, the wear on brake pads is avoided, and good economic efficiency is achieved.

Figure 2:
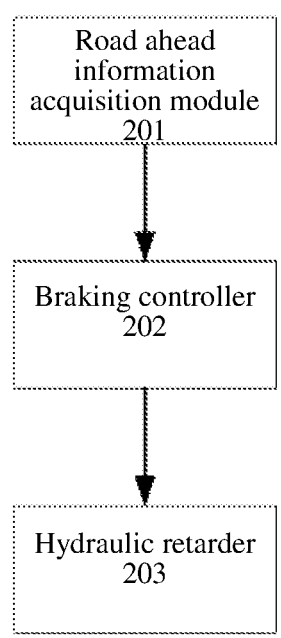
FIG. 2 is a schematic structural diagram of a system according to the present disclosure.

Embodiment 2: As shown in FIG. 2, a control system for a hydraulic retarder includes a road ahead information acquisition module 201, a braking controller 202, and the hydraulic retarder 203.

The road ahead information acquisition module 201 is configured to acquire information of a road ahead of a vehicle and send the information of the road ahead to the braking controller 202. The information of the road ahead includes a slope of a downhill road segment ahead of the vehicle and a distance between a current position of the vehicle and an origin of the downhill road segment ahead.

The braking controller 202 receives the information from the road ahead information acquisition module 201 for implementing the control method for the hydraulic retarder in Embodiment 1.

The hydraulic retarder 203 is controlled by the braking controller 202 to perform corresponding actions. The actions include starting oil filling, ending oil filling, starting braking, or ending braking.

The braking controller 202 further includes a storage module configured to store calibrated speeds, required braking forces and corresponding oil amounts in the form of a data table, a MAP graph, or a curve.

In this embodiment, the road ahead information acquisition module 201 may be an electronic horizon configured to acquire the information of the road ahead of the vehicle. Of course, the road ahead information acquisition module may also be implemented by other devices, as long as the function of the road ahead information acquisition module may be realized, which is not specifically limited by the present disclosure.

The above are only specific implementations of the present disclosure, but the design concept of the present disclosure is not limited thereto. Any non-substantial modification of the present disclosure based on this concept shall fall within the scope of protection of the present disclosure.

INDUSTRIAL APPLICABILITY

The control method for the hydraulic retarder and the control system according to the present disclosure are suitable for a cruising state with a steady vehicle speed, perform prediction and advanced control based on the information of the road ahead, and start the hydraulic retarder at the proper time, thus avoiding false triggering of an existing control method and alleviating the response lag of the hydraulic retarder. At the same time, by starting the hydraulic retarder for braking, the time for applying a brake for braking when the terrain changes may be shortened, thus lowering the wear of brake pads, reducing the waste of vehicle running costs, and having good economic efficiency.

The invention claimed is:

1. A control method for a hydraulic retarder, comprising:
   1.1 acquiring a slope of a downhill road segment ahead of a vehicle;
   1.2 determining whether an absolute value of the slope of the downhill road segment ahead of the vehicle is greater than an absolute value of a slope at which a steady speed of the vehicle is maintained due to gravity acting on the vehicle;
   1.3 when the absolute value of the slope of the downhill road segment ahead of the vehicle is greater than the absolute value of the slope at which the steady speed of the vehicle is maintained due to the gravity acting on the vehicle, predicting a required braking force for the vehicle to travel, at the steady speed, on the downhill road segment ahead, and an oil amount required for the required braking force;
   1.4 predicting corresponding oil filling time according to the required oil amount;
   1.5 predicting, according to the oil filling time, a distance between the vehicle and an origin of the downhill road segment ahead at a start time of oil filling of the hydraulic retarder;
   1.6 in the case that an actual distance between the vehicle and the origin of the downhill road segment ahead is equal to a predicted distance, controlling the hydraulic retarder to start oil filling; and
   1.7 upon the vehicle reaching the origin of the downhill road segment ahead, controlling the hydraulic retarder to start braking.

2. The control method for a hydraulic retarder according to claim 1, wherein after step 1.7, the method further comprises:
   when the vehicle ends traveling on the downhill road segment ahead, ending braking by the hydraulic retarder.

3. The control method for a hydraulic retarder according to claim 1, wherein a calculation formula of the slope at which the steady speed of the vehicle is maintained due to the gravity acting on the vehicle in step 1.2 is as follows:

$$\theta_{min} = -\mu - \frac{C_d H V_a^2}{21.15 \text{ mg}}$$

wherein $\theta_{min}$ denotes the slope at which the steady speed of the vehicle is maintained due to the gravity acting on the vehicle, $\mu$ denotes a road friction coefficient, $C_d$ denotes an air density, H denotes a windward area of the vehicle, $V_a$ denotes a windward speed of the vehicle, m denotes a mass of the vehicle and a load carried, and g denotes an acceleration of the gravity.

4. The control method for a hydraulic retarder according to claim 1, wherein step 1.3 comprises:
   predicting the required braking force $T_r$ for the vehicle to travel, at the steady speed, on the slope of the downhill road segment ahead according to the following calculation formula:

$$T_r = mg(\theta - \theta_{min})$$

wherein m denotes a mass of the vehicle and a load carried, g denotes an acceleration of the gravity, θ denotes the slope of the downhill road segment ahead of the vehicle, and $\theta_{min}$ denotes the slope at which the steady speed of the vehicle is maintained due to the gravity acting on the vehicle; and calculating the oil amount Q required for the required braking force according to the following calculation formula:

$$Q = \frac{T_r}{\rho(v_3 R_3 - v_1 R_1)}$$

wherein $v_1$ denotes a flow velocity of oil at an inlet of a rotor impeller of the hydraulic retarder; $v_3$ denotes a flow velocity of the oil at the inlet of the rotor impeller; $R_1$ denotes a radius of an oil inlet of the rotor impeller; $R_3$ denotes a radius of an oil outlet of the rotor impeller; and $\rho$ denotes an oil density.

5. The control method for a hydraulic retarder according to claim 1, wherein step 1.3 comprises:
calibrating required braking forces for the vehicle to travel, at different speeds, on the downhill road segment ahead, and corresponding oil amounts to yield calibrated data; and
acquiring a current traveling speed of the vehicle, and acquiring, based on the calibrated data, the required braking force Ty for the vehicle to travel on the downhill road segment ahead, and the oil amount Q required for the required braking force, the calibrated data comprising the calibrated speeds, the required braking forces and the corresponding oil amounts.

6. The control method for a hydraulic retarder according to claim 5, wherein the calibrated speeds, the required braking forces and the corresponding oil amounts are stored in the form of a data table, a graph, or a curve.

7. The control method for a hydraulic retarder according to claim 4, wherein a calculation formula for predicting the oil filling time in step 1.4 is as follows:

$$t = \frac{Q}{CA_1 V_1}$$

wherein t denotes the oil filling time; Q denotes the oil amount; C denotes a flow coefficient; $A_1$ denotes a flow cross-sectional area of an oil filling line; and $V_1$ denotes an average velocity of oil filling.

8. The control method for a hydraulic retarder according to claim 1, wherein a calculation formula for predicting the distance in step 1.5 is as follows:

Offset=$V_t$ wherein Offset denotes the predicted distance, t denotes the oil filling time; and V denotes the steady speed of the vehicle.

9. A control system, comprising a road ahead information acquisition module, a braking controller, and a hydraulic retarder;
the road ahead information acquisition module is configured to acquire information of a road ahead of a vehicle and send the information of the road ahead to the braking controller, the information of the road ahead comprising a slope of a downhill road segment ahead of the vehicle and a distance between the vehicle and an origin of the downhill road segment ahead;
the braking controller receives the information from the road ahead information acquisition module for implementing the control method for the hydraulic retarder according to claim 1; and
the hydraulic retarder is controlled by the braking controller to perform corresponding actions, the actions comprising at least one of starting oil filling, ending oil filling, starting braking or ending braking.

10. The control system according to claim 9, wherein the road ahead information acquisition module is implemented through an electronic horizon.

11. The control system according to claim 9, wherein the braking controller comprises a storage module configured to store pre-calibrated speeds, required braking forces and corresponding oil amounts in the form of a data table, a MAP graph or a curve.

12. The control method for a hydraulic retarder according to claim 6, wherein a calculation formula for predicting the oil filling time in step 1.4 is as follows:

$$t = \frac{Q}{CA_1 V_1}$$

wherein t denotes the oil filling time; Q denotes the oil amount; C denotes a flow coefficient; $A_1$ denotes a flow cross-sectional area of an oil filling line; and $V_1$ denotes an average velocity of oil filling.

13. The control method for a hydraulic retarder according to claim 12, wherein a calculation formula for predicting the distance in step 1.5 is as follows:

Offset=$V_t$ wherein Offset denotes the predicted distance, t denotes the oil filling time; and I denotes the steady speed of the vehicle.

14. The control method for a hydraulic retarder according to claim 7, wherein a calculation formula for predicting the distance in step 1.5 is as follows:

Offset=$V_t$ wherein Offset denotes the predicted distance, t denotes the oil filling time; and V denotes the steady speed of the vehicle.

* * * * *